United States Patent
Tian et al.

(10) Patent No.: US 12,361,577 B2
(45) Date of Patent: Jul. 15, 2025

(54) METHOD AND SYSTEM FOR AUTOMATICALLY COLLECTING MULTIPLE INFORMATION OF TUNNEL DURING CONSTRUCTION PERIOD

(71) Applicants: China Railway Economic and Planning Research Institute Co., Ltd., Beijing (CN); Nanjing Pioneer Awareness Information Technology Co., Ltd, Nanjing (CN)

(72) Inventors: Siming Tian, Nanjing (CN); Zhengying Shi, Nanjing (CN); Weike Xin, Nanjing (CN); Shu Li, Nanjing (CN); Jianxun Huo, Nanjing (CN); Liewei Wang, Nanjing (CN); Jie Lian, Nanjing (CN); Guangbin Ni, Nanjing (CN); Guoqiang Wu, Nanjing (CN); Xinyan Wu, Nanjing (CN); Xu Li, Nanjing (CN); Yiteng Zhang, Nanjing (CN)

(73) Assignees: China Railway Economic and Planning Research Institute Co., Ltd., Beijing (CN); Nanjing Pioneer Awareness Information Technology Co., Ltd, Nanjing (CN)

(*) Notice: Subject to any disclaimer, the term of this patent is extended or adjusted under 35 U.S.C. 154(b) by 0 days.

(21) Appl. No.: 18/957,460

(22) Filed: Nov. 22, 2024

(65) Prior Publication Data
US 2025/0095177 A1 Mar. 20, 2025

Related U.S. Application Data

(63) Continuation of application No. PCT/CN2024/111347, filed on Aug. 12, 2024.

(30) Foreign Application Priority Data

Aug. 15, 2023 (CN) .......................... 202311029837.4

(51) Int. Cl.
| | |
|---|---|
| *G06T 7/521* | (2017.01) |
| *E21D 9/00* | (2006.01) |
| *E21D 20/02* | (2006.01) |
| *G01B 11/16* | (2006.01) |
| *G06T 7/00* | (2017.01) |
| *G06T 7/246* | (2017.01) |

(Continued)

(52) U.S. Cl.
CPC .............. *G06T 7/521* (2017.01); *E21D 9/003* (2013.01); *G01B 11/167* (2013.01);
(Continued)

(58) Field of Classification Search
None
See application file for complete search history.

(56) References Cited

U.S. PATENT DOCUMENTS

| | | | |
|---|---|---|---|
| 2016/0333690 A1* | 11/2016 | Puura ....................... | G01C 7/06 |
| 2020/0182718 A1* | 6/2020 | Li ........................... | G01S 17/88 |

(Continued)

FOREIGN PATENT DOCUMENTS

| | | |
|---|---|---|
| CN | 105756711 | 7/2016 |
| CN | 111102935 | 5/2020 |

(Continued)

OTHER PUBLICATIONS

Ma Zijun et al., "Application of 3D laser scanner in tunnel construction discussion," Bulletin of Surveying and Mapping, 2020, vol. 0, Issue (3), pp. 157-159. Date of issue: Mar. 25, 2020 doi: 10.13474/j.cnki.11-2246.2020.0099 Related pages: full text. Claims involved: 1-10.

(Continued)

*Primary Examiner* — Frank S Chen
(74) *Attorney, Agent, or Firm* — Pilloff Passino & Cosenza LLP; Rachel Pilloff; Sean Passino

(57) ABSTRACT

A method and a system for automatically collecting multiple information of a tunnel during construction period are (Continued)

provided. A detection point and a detection line are formed by projecting a light source on the inner wall of the tunnel, and then the pixel position changes of the areas where the detection point and the detection line are located in different time periods are recorded by a measuring camera, and the detection point and the detection line are integrated and corrected with tunnel point cloud data as a reference standard to form an accurate four-dimensional model of the tunnel.

2 Claims, 12 Drawing Sheets

(51) Int. Cl.
 *G06T 7/55* (2017.01)
 *G06T 7/73* (2017.01)
 *G06T 17/00* (2006.01)

(52) U.S. Cl.
 CPC ............ *G06T 7/0002* (2013.01); *G06T 7/246* (2017.01); *G06T 7/55* (2017.01); *G06T 7/73* (2017.01); *G06T 17/00* (2013.01); *E21D 20/02* (2013.01); *G06T 2207/10016* (2013.01); *G06T 2207/10028* (2013.01); *G06T 2207/30172* (2013.01); *G06T 2207/30184* (2013.01); *G06T 2207/30232* (2013.01)

(56) References Cited

U.S. PATENT DOCUMENTS

| | | |
|---|---|---|
| 2021/0141071 A1 | 5/2021 | Cunningham et al. |
| 2022/0112806 A1 | 4/2022 | Luo et al. |

FOREIGN PATENT DOCUMENTS

| | | |
|---|---|---|
| CN | 111473739 | 7/2020 |
| CN | 114092797 | 2/2022 |
| CN | 114581371 | 6/2022 |
| CN | 115526861 | 12/2022 |
| CN | 116108525 | 5/2023 |
| CN | 116858098 | 10/2023 |
| JP | 2011203090 | 10/2011 |
| JP | 2016205837 | 12/2016 |
| KR | 20110008402 | 1/2011 |
| KR | 102091451 | 3/2020 |
| WO | 2021044628 | 3/2021 |

OTHER PUBLICATIONS

Quan Jiang et al., "Observe the temporal evolution of deep tunnel's 3D deformation by 3D laser scanning in the Jinchuan No. 2 Mine," Tunnelling and Underground Space Technology, Jan. 8, 2020, vol. 97, No. 103237, pp. 1-17 doi: 10.1016/j.tust.2019.103237.

Retrieval report dated Dec. 13, 2023 in SIPO application No. 202311029837.4.

Notification to Grant Patent Right for Invention dated Jan. 16, 2024 in SIPO application No. 202311029837.4.

Notice of the First Office Action dated Dec. 15, 2023 in SIPO application No. 202311029837.4.

Supplementary Retrieval report dated Jan. 10, 2024 in SIPO application No. 202311029837.4.

International Search Report for PCT/CN2024/111347, dated Sep. 14, 2024.

* cited by examiner

METHOD AND SYSTEM FOR AUTOMATICALLY COLLECTING MULTIPLE INFORMATION OF TUNNEL DURING CONSTRUCTION PERIOD

CROSS-REFERENCE TO RELATED APPLICATIONS

This application is a continuation of PCT/CN2024/111347, filed on Aug. 12, 2024 and claims priority of Chinese Patent Application No. 202311029837.4, filed on Aug. 15, 2023, the entire contents of which are incorporated herein by reference.

TECHNICAL FIELD

The disclosure relates to the technical field of tunnel monitoring during construction, and in particular to a method and a system for automatically collecting multiple information of a tunnel during construction period.

BACKGROUND

After the initial support in tunnel construction, it is necessary to carry out monitoring survey to obtain the deformation data of initial support and control the construction quality of tunnel. At present, in the process of tunnel construction, expensive total station combined with target is often used to monitor the deformation of tunnel crown and side wall fixed points periodically.

On the one hand, this method of monitoring the deformation inside the tunnel periodically and intermittently may not guarantee the real-time update of deformation data and may not play a role in timely warning to engineers;

On the other hand, the monitoring points of the target are discontinuous, and the vertical spacing of the target points is long and the cross-sectional points are sparse. It is impossible to measure the deformation of the continuous sections of the tunnel.

To sum up, the traditional tunnel deformation monitoring method has high equipment cost, which may not be monitored in real time and the monitoring range is limited, which may not reflect the deformation parameters of the inner wall of the tunnel as a whole, which is not conducive to the control of construction quality and safety by engineers.

In view of this, in order to improve the above technical problems, the disclosure provides a method and a system for automatically collecting multiple information of a tunnel during construction period.

SUMMARY

In an aspect, the disclosure provides a system for automatically collecting multiple information of a tunnel during construction period, comprising:
a plurality of light sources, where the light sources are set on a side wall of the tunnel to form detection points and/or detection lines on an inner wall of the tunnel; a plurality of measuring cameras are erected around the detection points and/or the detection lines, and the measuring cameras are used for collecting and recording image data of areas of the detection points and/or the detection lines in real time, and a shooting visual angle range formed by a combination of the measuring cameras covers all surfaces of the areas of the detection points and/or the detection lines;

a data processor, where a signal input end of the data processor is connected with the measuring cameras, used for receiving the image data collected by the measuring cameras in real time, calculating three-dimensional coordinates of the areas of the detection points and/or the detection lines taking the detection points and/or the detection lines as position references respectively, calculating sizes and shapes of the areas of the detection points and/or the detection lines with the image data of the areas of the detection points and/or the detection lines obtained from different shooting visual angles, and then integrating the three-dimensional coordinates, size and shape information to establish low-density point cloud data of the inner wall of the tunnel; and an application terminal, where a signal input end of the application terminal is connected with a signal output end of the data processor, and is used for receiving real-time point cloud data updated and corrected by the data processor, and displaying a four-dimensional model of the tunnel established according to the point cloud data, and at the same time, feeding back and displaying deformation data, concrete thickness data, tunnel flatness data, anchor rod number, position data and tunnel face sketch data including the areas of the detection points and/or the detection lines according to the four-dimensional model.

Optionally, the light sources are one or more combinations of the point light source, the line light source and the surface light source.

In an another aspect, the disclosure provides a method for automatically collecting the multiple information of the tunnel during the construction period, which adopts the system for automatically collecting multiple information of a tunnel during construction period, including:
step 101: arranging a plurality of the light sources in lateral or longitudinal direction of the side wall of the tunnel, and forming the detection points and/or the detection lines on a crown and the side wall of the tunnel by using the light sources;
step 102: erecting a plurality of the measuring cameras around the detection points and/or the detection lines, and shooting and collecting the image data of a whole area of the detection points and/or the detection lines in different time periods in real time from multiple angles by using a cooperation of the measuring cameras;
step 103: transmitting the image data collected by the measuring cameras in real time to the data processor, and by the data processor, calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from different shooting visual angles, and then integrating the three-dimensional coordinates, the size and shape information to establish the low-density point cloud data of the inner wall of the tunnel;
at the same time, using an image capture algorithm to compare pixel displacement data and key frame data of an area of a same detection point and/or detection line at different angles in different periods; and taking the detection points and/or the detection lines as an alignment benchmark, and using the pixel displacement data and the key frame data in the areas of the detection points and/or the detection lines, calibrating and updating a part of point clouds generating position movement in the point cloud data in real time;

step 104: sending real-time corrected point cloud data to the application terminal by the data processor to convert into the four-dimensional model of the tunnel;

step 105: displaying a continuously corrected and converted four-dimensional model of the tunnel by the application terminal according to an order of a time axis to obtain a dynamic four-dimensional model of the tunnel; and step 106: using an image comparison algorithm to compare a new three-dimensional model with a historical three-dimensional model by the application terminal, and displaying real-time dynamic deformation data, concrete thickness data and tunnel flatness data of the tunnel inner wall.

Optionally, the light sources in the step 101 include a point light source, and a method for realizing deformation detection of an accurate point on the crown and side wall of the tunnel based on the point light source is as follows:

step 201: projecting the point light source to a certain point needing accurate observation on the side wall of the tunnel to form a detection point;

step 202: erecting a plurality of the measuring cameras around the detection point, and shooting and collecting the image data of a whole detection point in the different time periods from the multiple angles by using the cooperation of the measuring cameras;

step 203: transmitting the image data collected by the measuring cameras to the data processor, and using the image capture algorithm to compare the pixel displacement data and the key frame data of the area of the same detection point at the different angles by the data processor in the different time periods frame by frame, and then calculating the deformation data of the area of the detection point; and step 204: sending the deformation data of the area of the detection point and the time axis to the application terminal by the data processor for displaying current deformation data of area of the side wall of the tunnel of the detection point.

Optionally, the light source in the step 101 includes a line light source, and the tunnel wall deformation detection method based on the line light source is as follows:

step 301: installing a plurality of line light sources on the crown and side wall of the tunnel along a length direction of the tunnel, and forming section detection lines with a same or arbitrary spacing on the crown and the side wall of the tunnel;

step 302: erecting a plurality of the measuring cameras around the detection lines, and using the cooperation of the plurality of the measuring cameras to shoot image data in the different time periods in a whole area of the detection lines at the multiple angles;

step 303: transmitting the image data collected by the measuring cameras to the data processor, calculating the three-dimensional coordinates of the area of the detection lines taking the detection lines as the position references respectively, calculating the size and the shape of the area of the detection lines with the image data of the area of the detection lines obtained from different shooting visual angles, and then integrating the three-dimensional coordinates, the size and shape information to establish the low-density point cloud data of the inner wall of the tunnel;

at the same time, extracting the area of the detection lines by a threshold segmentation and centerline extraction algorithm, and then fusing with original detection lines and historical pixel position data of the area of the detection lines to obtain pixel displacement data and key frame data of a same area of the detection lines at the different angles in the different time periods; and using the detection lines as an alignment benchmark to calibrate and update the part of the point clouds generating the position movement in the point cloud data in real time by using the pixel displacement data and the key frame data in the area of the detection lines;

step 304: sending corrected point cloud data to the application terminal by the data processor to convert into the four-dimensional model of the tunnel;

step 305: displaying the continuously corrected and converted four-dimensional model of the tunnel by the application terminal according to the order of the time axis to obtain the dynamic four-dimensional model of the tunnel; and step 306: using the image comparison algorithm to compare the new three-dimensional model with the historical three-dimensional model by the application terminal, and displaying the real-time dynamic deformation data of the crown and the side wall of the detection lines in the tunnel.

Optionally, the light sources in the step 101 also includes a surface light source, and the tunnel wall deformation detection method based on the surface light source is as follows:

step 401: installing a plurality of surface light sources on the side wall of the tunnel along the length direction of the tunnel, and forming grid detection lines on the crown and side wall of the tunnel;

step 402: erecting a plurality of the measuring cameras around the grid detection lines, and using the cooperation of the plurality of the measuring cameras to shoot image data in the different time periods in a whole area of the grid detection lines at the multiple angles;

step 403: transmitting the image data collected by the measuring cameras to the data processor, calculating three-dimensional coordinates of the area of the grid detection lines taking the grid detection lines as the position references respectively, calculating the size and the shape of the area of the detection lines with the image data of the area of the detection lines obtained from different shooting visual angles, and then integrating the three-dimensional coordinates, the size and shape information by a pixel position of the grid detection lines in the image data to establish the low-density point cloud data of the inner wall of the tunnel;

at the same time, extracting intersections of the grid detection lines as capture points using a deep learning image segmentation algorithm by the data processor, and obtaining pixel displacement data and key frame data of a same capture point area in the different time periods at the different angles, and calculating pixel displacement data of the area of the detection lines between two adjacent capture points based on the capture points; and then integrating the three-dimensional coordinates, the size and shape information to establish low-density point cloud data of the inner wall of the tunnel;

step 404: sending the corrected point cloud data to the application terminal to convert into the four-dimensional model of the tunnel;

step 405: displaying the continuously corrected and converted four-dimensional model of the tunnel by the application terminal according to the order of the time axis to obtain the dynamic four-dimensional model of the tunnel; and step 406: using the image comparison algorithm to compare the new three-dimensional model with the historical three-dimensional model by the application terminal, and displaying overall dynamic deformation parameters of tunnel crown and side wall space.

Optionally, the corrected point cloud data in the step 104 is also capable of being used to calculate the concrete thickness of the inner wall of the tunnel, and a specific calculation method is as follows:

step 501: setting the grid detection lines as reference lines;

step 502: calculating an intersection distance between a normal vector of each cloud point in the point cloud data and the reference lines;

step 503: calling out cloud point position data and matching with intersection distance data; and step 504: synchronizing and matching the intersection distance data to the three-dimensional model of the tunnel based on the cloud point position data to obtain concrete thickness at different positions in the tunnel.

Optionally, the four-dimensional tunnel model generated in the step 105 is also capable of being used to measure smoothness of the inner wall of the tunnel, and a specific measurement method is as follows:

step 601: taking the detection points and/or the detection lines as position reference points, obtaining a centerline of a three-dimensional tunnel model by a centerline capture algorithm;

step 602: expanding a whole three-dimensional tunnel model along a centerline of the three-dimensional tunnel model to generate an orthogonal image map;

step 603: obtaining an elevation difference between the normal vector of the cloud point in the orthogonal image map and the detection points and/or the detection lines on an inner wall surface of the tunnel by using a three-dimensional measurement algorithm; and step 604: collecting elevation difference data to obtain flatness of the inner wall of the tunnel.

Optionally, a data collection method of the measuring cameras in the step 102 is also capable of being used to record a shotcrete and anchor support process and positions and a number of anchor holes, and a specific recording method is as follows:

step 701: erecting the measuring cameras in the tunnel to record a whole anchor support process by video to form video data;

step 702: transmitting the video data collected by the measuring cameras in real time to the data processor, and calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from different shooting visual angles, and then integrating the three-dimensional coordinates, the size and shape information to establish the low-density point cloud data of the inner wall of the tunnel;

at the same time, using an image identification technology to automatically identify the anchor rods and the number in the video data by the data processor, and locating positions of the anchor rods with an assistance of the detection points and/or the detection lines; then, integrating and correcting position and quantity information of the anchor rods and the point cloud data with the detection points and/or the detection lines as the position references again;

step 703: sending the corrected point cloud data to the application terminal to convert into the four-dimensional model of the tunnel; and step 704: displaying the positions and the number of the anchor rods and drilling time of each hole in the four-dimensional model of the tunnel by the application terminal; where the video data recorded by the measuring cameras is also capable of being derived to form a working video summary.

Optionally, the data collection method of the measuring cameras in the step 102 is also capable of being used to generate the tunnel face sketch data, and a specific generation method is as follows:

step 801: erecting the plurality of the measuring cameras in front of the tunnel face at different angles and positions;

step 802: capturing formation image data of the tunnel face in real time by the measuring camera;

step 803: transmitting the image data collected by the measuring cameras to the data processor, and using the image identification technology to analyze the image data of the tunnel face obtained from different shooting visual angles by the data processor, so as to obtain type data of tunnel face rocks, integrity data of rock and soil, groundwater outflow state data and rock hardness data; and step 804: receiving image information integrated by the data processor by the application terminal, and displaying a tunnel face sketch image marked with the type data of face rocks, the integrity data of rock and soil, the groundwater outflow state data and the rock hardness data.

The disclosure has the following beneficial effects.

First, according to the disclosure, the low-density point cloud data of a tunnel is constructed by the cooperation of a measuring camera, a detection point and a detection line, and converted into a four-dimensional model of the tunnel, and the deformation data of the inner wall of the tunnel is obtained through the size comparison of the four-dimensional model in different time periods. This method replaces the traditional method of total station mobile measuring target to monitor tunnel displacement, which realizes real-time monitoring and feedback of tunnel inner wall deformation data and effectively ensures the continuity, integrity and timeliness of tunnel monitoring.

Second, according to the disclosure, the low-density point cloud data of the tunnel is formed by the cooperation of the measuring camera, the detection point and the detection line, and the cloud points in the point cloud data that move in position are updated through the image information collected by the measuring camera in real time. Therefore, the latest point cloud data may be transmitted to the application terminal to generate the latest four-dimensional tunnel model in real time, thus avoiding the need to repeatedly reconstruct the point cloud data of the whole tunnel, which consumes a lot of calculation power, and ensuring the efficient operation of the whole operation flow.

Third, the detection points and/or detection lines in the disclosure may not only be used as construction lines to assist the camera in capturing the shape of the monitoring area, but also may be used as position reference lines to provide reference standards for the synthesis and update of point cloud data, the positioning of anchor rod position, the flattening of tunnel curved surface and the measurement of concrete thickness, so that the obtained data may accurately correspond to the actual situation of the tunnel and the result is more accurate.

Fourth, according to the disclosure, partial updating and replacement of the point cloud data are realized by using the pixel displacement data, and a real-time updated four-dimensional model is obtained, so that the sketch information of the tunnel face, the construction progress of the anchor rod, the layout position of the anchor rod, the concrete thickness and flatness in any area and the deformation parameters of the inner wall in any area may be obtained more timely and accurately. At the same time, the above information may be collected, integrated and displayed through one system, which improves the automation and intelligence of the whole tunnel construction monitoring system and makes the whole tunnel construction more efficient, safe and accurate.

DETAILED DESCRIPTION OF THE EMBODIMENTS

In order to deepen the understanding of the disclosure, the disclosure will be further described in detail with embodiment, which are only used to explain the disclosure and do not constitute a limitation on the protection scope of the disclosure.

Embodiment 1

Figure 1:
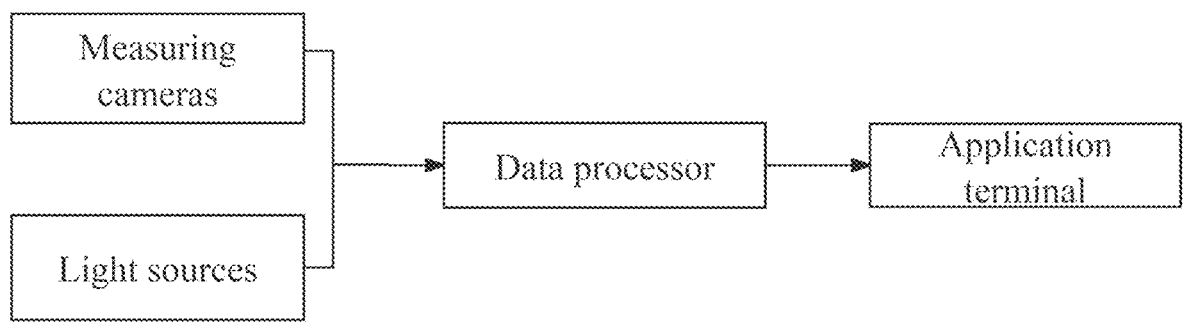
FIG. 1 is a schematic diagram of the system composition structure of the present disclosure

As shown in FIG. 1, Embodiment 1 of the present disclosure provides a system for automatically collecting multiple information of a tunnel during construction period, which includes a plurality of light sources, where the light sources are set on a side wall of the tunnel to form detection points and/or detection lines on an inner wall of the tunnel;

a plurality of measuring cameras are erected around the detection points and/or the detection lines, and the measuring cameras are used for collecting and recording image data of areas of the detection points and/or the detection lines in real time, and a shooting visual angle range formed by a combination of the measuring cameras covers all surfaces of the areas of the detection points and/or the detection lines;

a data processor, where a signal input end of the data processor is connected with the measuring cameras, used for receiving the image data collected by the measuring cameras in real time, calculating three-dimensional coordinates of the areas of the detection points and/or the detection lines taking the detection points and/or the detection lines as position references respectively, calculating sizes and shapes of the areas of the detection points and/or the detection lines with the image data of the areas of the detection points and/or the detection lines obtained from different shooting visual angles, and then integrating the three-dimensional coordinates, size and shape information to establish low-density point cloud data of the inner wall of the tunnel; and an application terminal, where a signal input end of the application terminal is connected with a signal output end of the data processor, and is used for receiving real-time point cloud data updated and corrected by the data processor, and displaying a four-dimensional model of the tunnel established according to the point cloud data, and at the same time, feeding back and displaying deformation data, concrete thickness data, tunnel flatness data, anchor rod number, position data and tunnel face sketch data including the areas of the detection points and/or the detection lines according to the four-dimensional model.

The light sources are one or more combinations of the point light source, the line light source and the surface light source.

Tunnel engineers may flexibly select suitable light sources to monitor the deformation of the tunnel according to the different needs of tunnel monitoring, and then use a plurality of measuring cameras, preferably three, to collect images of one or more detection points and one or more detection lines from three different angles, where the shooting visual angles formed by the three measuring cameras with different angles may cover all surfaces of the area of the detection lines or the detection points.

Therefore, the image data of detection points or detection lines in different time periods are collected in an all-round way, which avoids the disadvantages that a single measuring camera has a fixed shooting visual angle and loses some deformation data in a limited viewing angle range, and ensures that the data processor may obtain accurate pixel displacement data and key frame data of detection lines or detection points when analyzing image data.

Pixel displacement data and key frame data based on detection lines or detection points are used to update and replace cloud points in low-density point cloud data that have moved in position, and the point cloud data after real-time correction is converted into a four-dimensional model with the assistance of application terminals, so that the basic data and deformation parameters of tunnel crown and side walls in different time periods may be freely observed, retrieved and displayed based on the four-dimensional model.

Then, by integrating the real-time pixel position data collected by the measuring camera with the point cloud data, the four-dimensional model of the tunnel is established, which not only realizes the continuous and real-time monitoring of the overall deformation of the tunnel, but also provides basic parameters for the data calculation of the later tunnel project, such as the calculation of the concrete thickness of side wall of the tunnel and the flatness.

Embodiment 2

Figure 2:
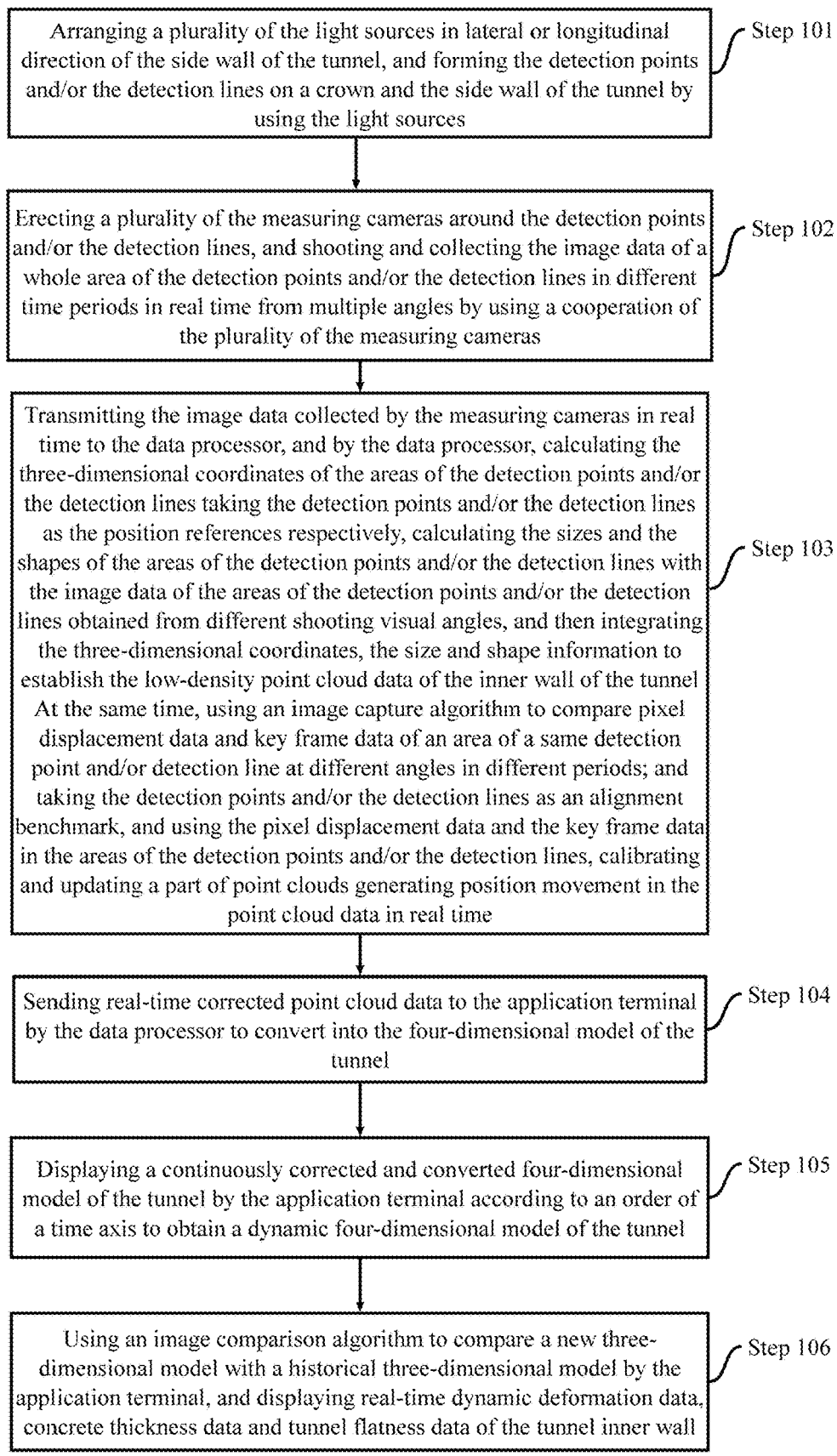
FIG. 2 is a schematic flow chart of a method for automatically collecting multiple information of a tunnel during construction period provided by the present disclosure

As shown in FIG. 2, Embodiment 2 puts forward a method for automatically collecting multiple information of a tunnel during construction period, and the specific collection formula is as follows:

step 101: arranging a plurality of the light sources in lateral or longitudinal direction of the side wall of the tunnel, and forming the detection points and/or the detection lines on a crown and the side wall of the tunnel by using the light sources;

step 102: erecting a plurality of the measuring cameras around the detection points and/or the detection lines, and shooting and collecting the image data of a whole area of the detection points and/or the detection lines in different time periods in real time from multiple angles by using a cooperation of the measuring cameras;

step 103: transmitting the image data collected by the measuring cameras in real time to the data processor, and by the data processor, calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from different shooting visual angles, and then integrating the three-dimensional coordinates, the size and shape information to establish the low-density point cloud data of the inner wall of the tunnel;

at the same time, using an image capture algorithm to compare pixel displacement data and key frame data of an area of a same detection point and/or detection line at different angles in different periods; and taking the detection points and/or the detection lines as an alignment benchmark, and using the pixel displacement data and the key frame data in the areas of the detection points and/or the detection lines, calibrating and updating a part of point clouds generating position movement in the point cloud data in real time;

step 104: sending real-time corrected point cloud data to the application terminal by the data processor to convert into the four-dimensional model of the tunnel;

step 105: displaying a continuously corrected and converted four-dimensional model of the tunnel by the application terminal according to an order of a time axis to obtain a dynamic four-dimensional model of the tunnel; and step 106: using an image comparison algorithm to compare a new three-dimensional model with a historical three-dimensional model by the application terminal, and displaying real-time dynamic deformation data, concrete thickness data and tunnel flatness data of the tunnel inner wall.

A reference point and/or a reference line are constructed on the inner wall of the tunnel by using the detection point and/or the detection line, and the position data of the areas of the detection points and/or the detection lines monitored by the measuring cameras are correspondingly integrated in real time into the point cloud data by using the reference point and/or the reference line as an alignment benchmark.

In the subsequent monitoring process, it is necessary to use the measuring cameras to monitor the areas where multiple detection points or lines are located in real time, so as to obtain the pixel displacement data of multiple detection points or multiple detection lines under the identification of the data processor, and the pixel displacement data and key frame data are used to replace and update the changed cloud points in the whole point cloud data.

Therefore, not only may the deformation area be monitored in real time by the measuring cameras, but also the obtained four-dimensional mode of the tunnel is always dynamically synchronized; moreover, the changed cloud points are replaced and updated by pixel displacement data and key frame data, and the replacement and reconstruction of some areas of the four-dimensional model are realized, which greatly saves the computational power of the overall reconstruction of the tunnel model on the premise of ensuring real-time monitoring.

Therefore, the traditional method of analyzing the deformation of the inner wall of the tunnel by using the scanning monitoring frequency of the total station once or twice a week in the tunnel construction process is shortened to the deformation analysis rate in seconds, which greatly improves the timeliness of tunnel monitoring and provides data guarantee for the construction personnel to safely construct in the tunnel and control the engineering quality.

Figure 3:
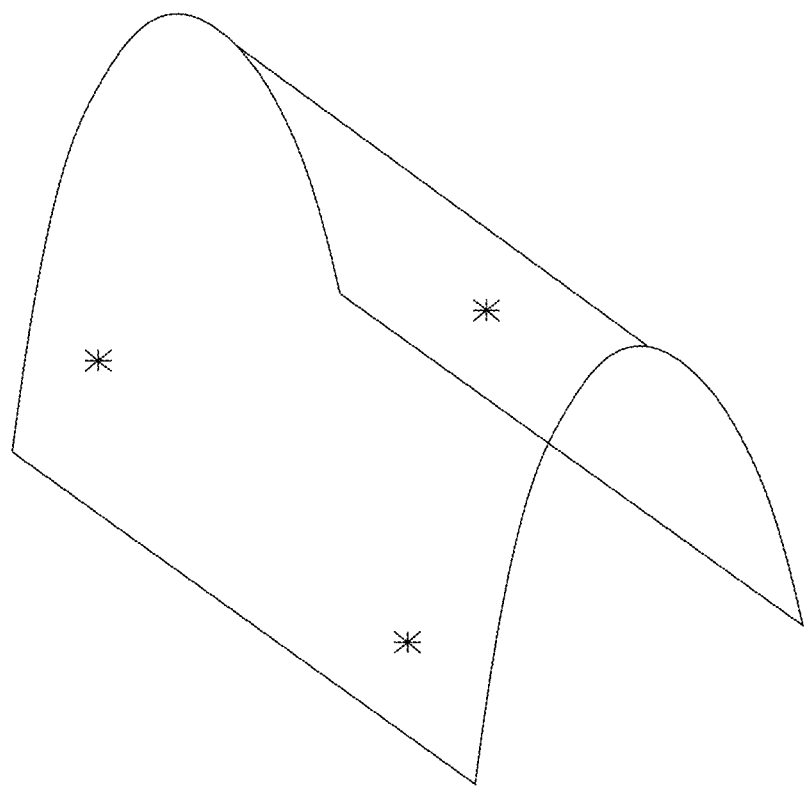
FIG. 3 is a schematic projection diagram of the point light source of the present disclosure
Figure 4:
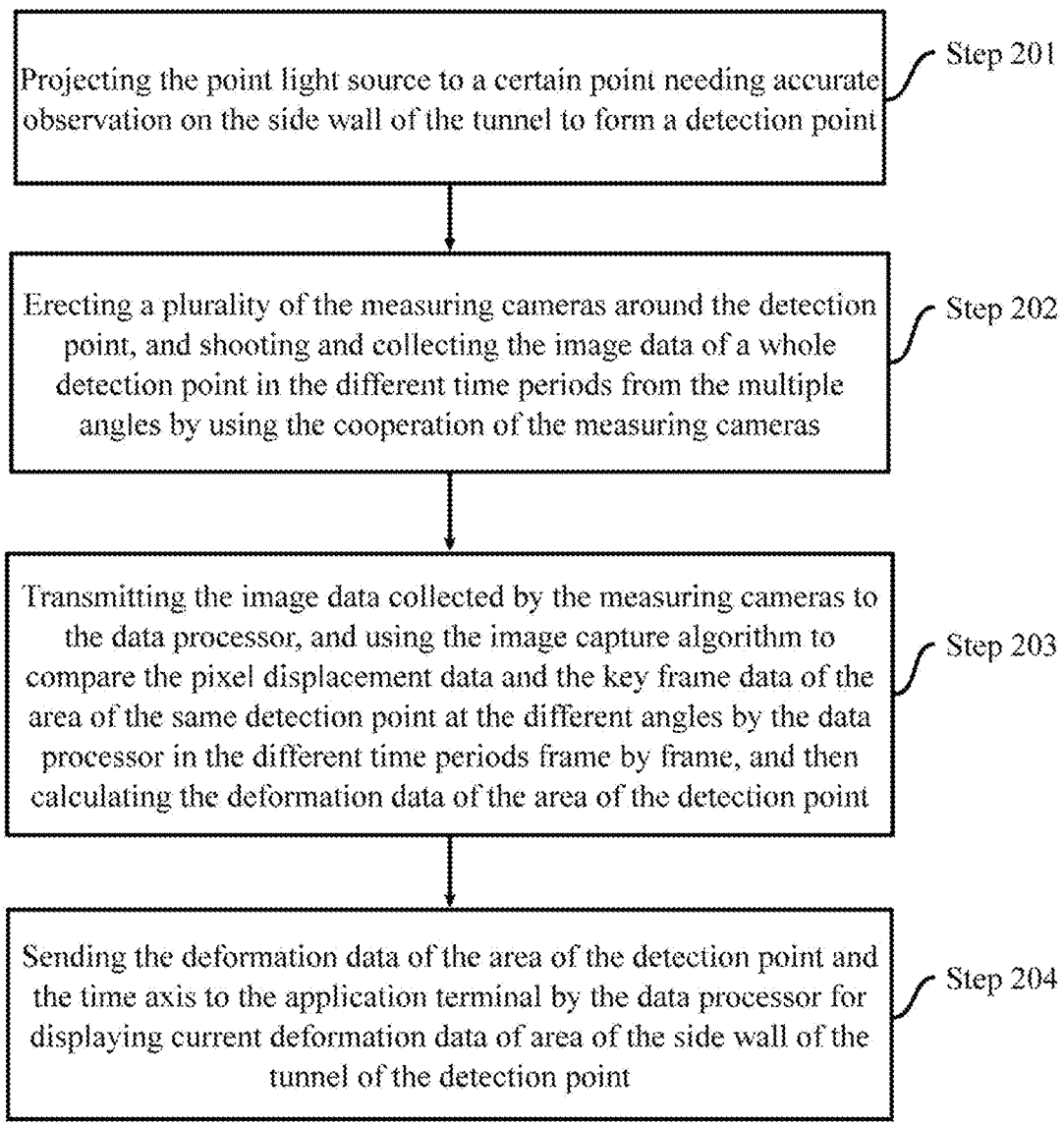
FIG. 4 is a schematic flow chart for detecting deformation of a certain point area of a tunnel by using a point light source

As shown in FIG. 3 to FIG. 4, the light sources in the step 101 include a point light source, and a method for realizing deformation detection of an accurate point on the crown and side wall of the tunnel based on the point light source is as follows:

step 201: projecting the point light source to a certain point needing accurate observation on the side wall of the tunnel to form a detection point;

step 202: erecting a plurality of the measuring cameras around the detection point, and shooting and collecting the image data of a whole detection point in the different time periods from the multiple angles by using the cooperation of the measuring cameras;

step 203: transmitting the image data collected by the measuring cameras to the data processor, and using the image capture algorithm to compare the pixel displacement data and the key frame data of the area of the same detection point at the different angles by the data processor in the different time periods frame by frame, and then calculating the deformation data of the area of the detection point; and step 204: sending the deformation data of the area of the detection point and the time axis to the application terminal by the data processor for displaying current deformation data of area of the side wall of the tunnel of the detection point.

Figure 5:
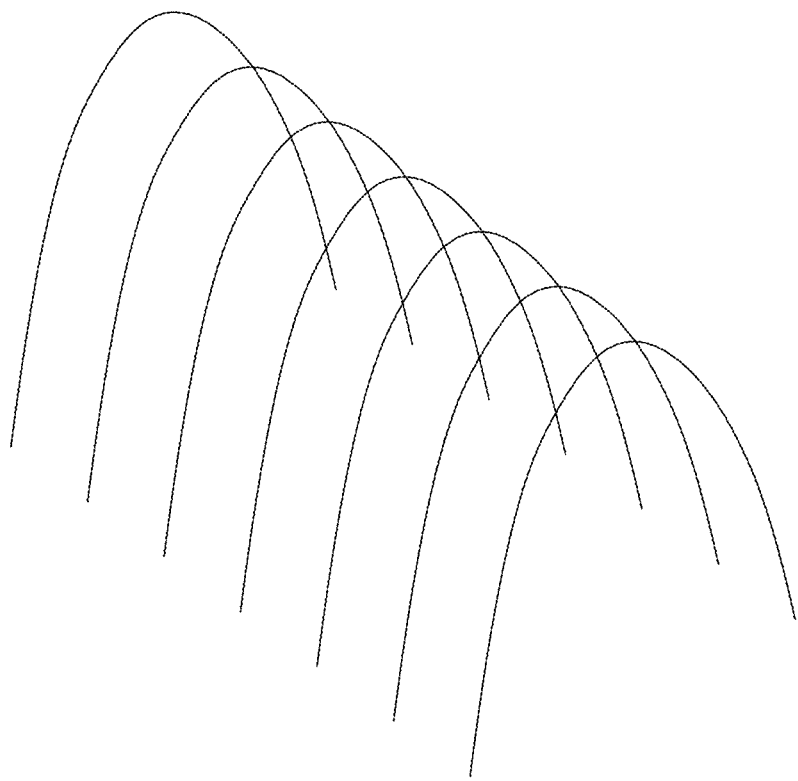
FIG. 5 is a schematic projection diagram of the linear light source of the present disclosure
Figure 6:
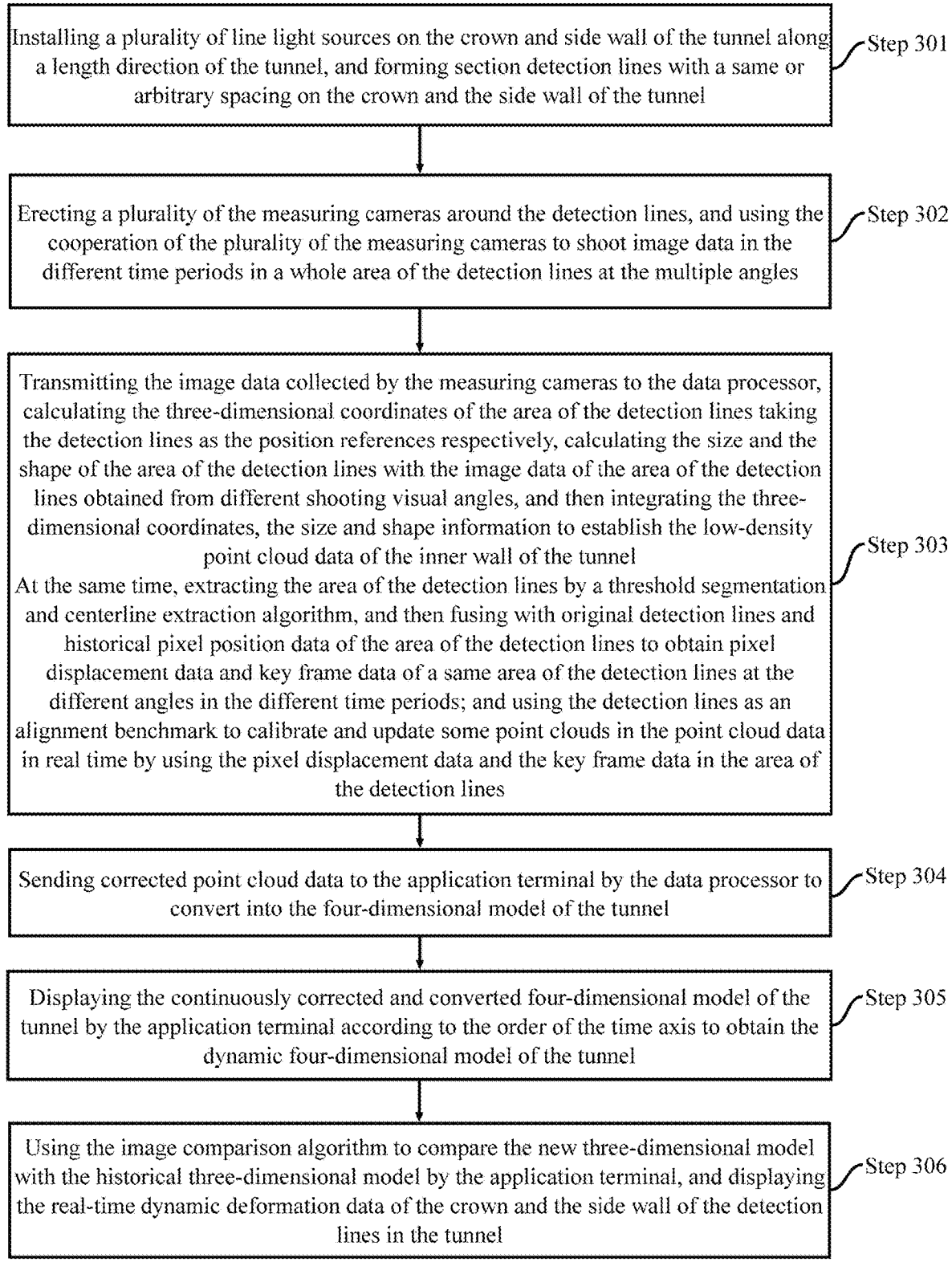
FIG. 6 is a schematic flow chart of the disclosure for detecting the deformation of a crown and side wall area of a tunnel by using a line light source

As shown in FIG. 5 to FIG. 6, he light source in the step 101 includes a line light source, and the tunnel wall deformation detection method based on the line light source is as follows:

step 301: installing a plurality of line light sources on the side wall of the tunnel along a length direction of the tunnel, and forming section detection lines with a same or arbitrary spacing on the crown and the side wall of the tunnel;

step 302: erecting a plurality of the measuring cameras around the detection lines, and using the cooperation of the plurality of the measuring cameras to shoot image data in the different time periods in a whole area of the detection lines at the multiple angles;

step 303: transmitting the image data collected by the measuring cameras to the data processor, calculating the three-dimensional coordinates of the area of the detection lines taking the detection lines as the position references respectively, calculating the size and the shape of the area of the detection lines with the image data of the area of the detection lines obtained from different shooting visual angles, and then integrating the three-dimensional coordinates, the size and shape information to establish the low-density point cloud data of the inner wall of the tunnel;

at the same time, extracting the area of the detection lines by a threshold segmentation and centerline extraction algorithm, and then fusing with original detection lines and historical pixel position data of the area of the detection lines to obtain pixel displacement data and key frame data of a same area of the detection lines at the different angles in the different time periods; and using the detection lines as an alignment benchmark to calibrate and update some point clouds in the point cloud data in real time by using the pixel displacement data and the key frame data in the area of the detection lines;

step 304: sending corrected point cloud data to the application terminal by the data processor to convert into the four-dimensional model of the tunnel;

step 305: displaying the continuously corrected and converted four-dimensional model of the tunnel by the application terminal according to the order of the time axis to obtain the dynamic four-dimensional model of the tunnel; and step 306: using the image comparison algorithm to compare the new three-dimensional model with the historical three-dimensional model by the application terminal, and displaying the real-time dynamic deformation data of the crown and the side wall of the detection lines in the tunnel.

Figure 7:
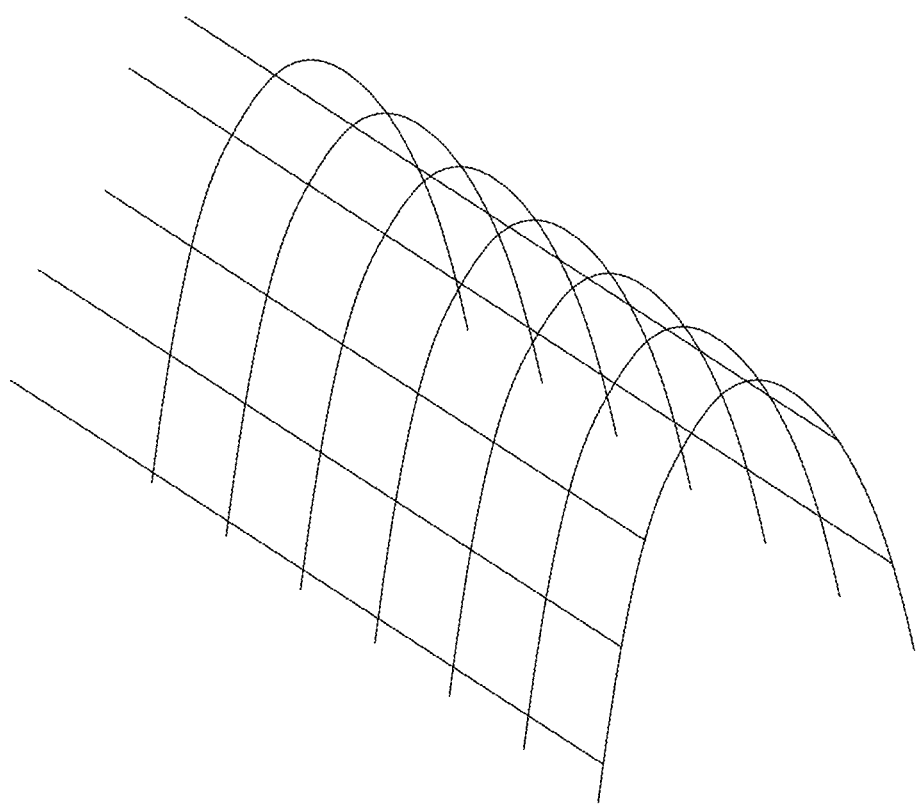
FIG. 7 is a schematic projection diagram of the surface light source of the present disclosure
Figure 8:
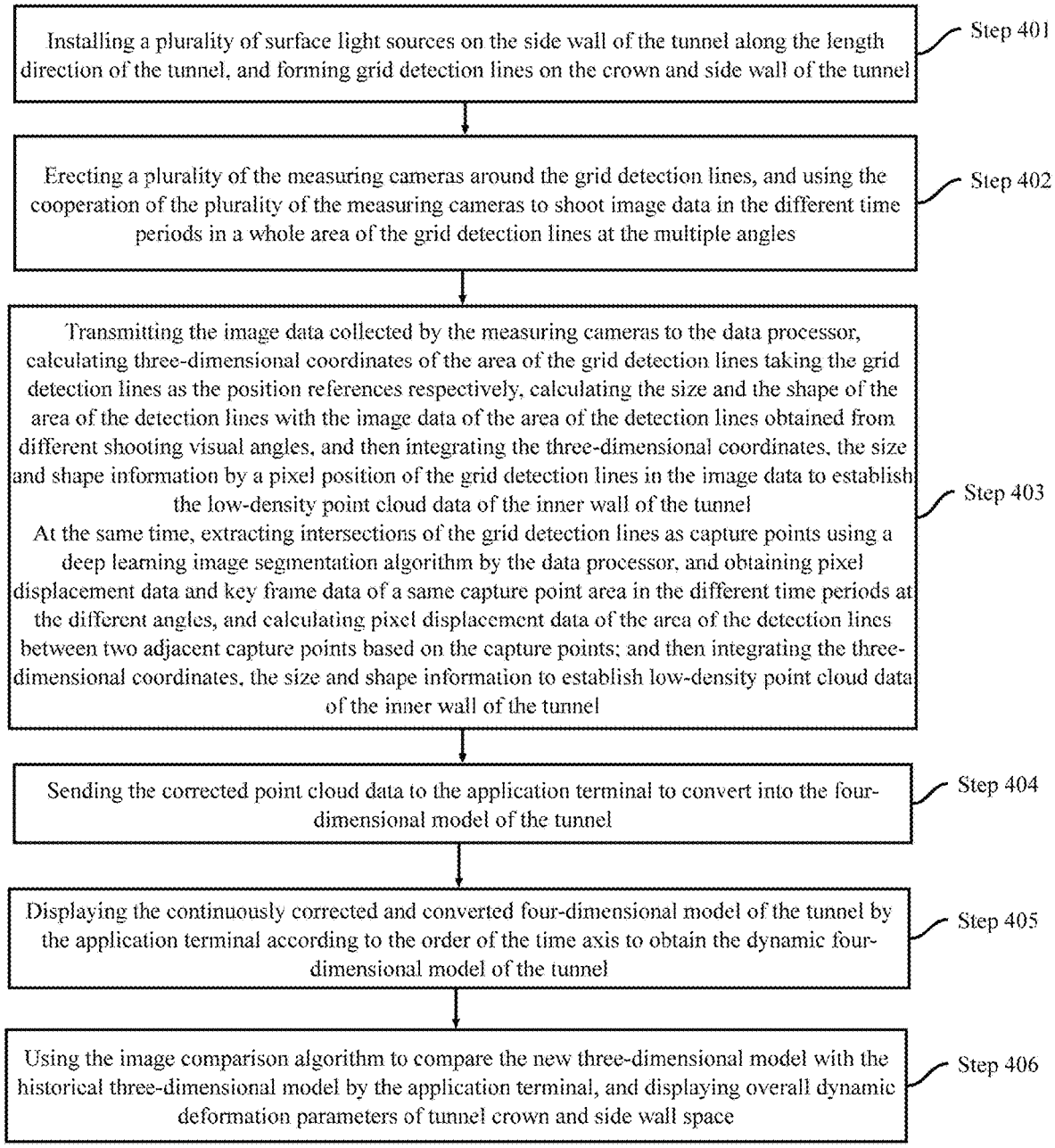
FIG. 8 is a schematic flow chart for detecting the deformation of the whole inner wall area of a tunnel by using a surface light source

As shown in FIG. 7 to FIG. 8, the light sources in the step 101 also includes a surface light source, and the tunnel wall deformation detection method based on the surface light source is as follows:

step 401: installing a plurality of surface light sources on the side wall of the tunnel along the length direction of the tunnel, and forming grid detection lines on the crown and side wall of the tunnel;

step 402: erecting a plurality of the measuring cameras around the grid detection lines, and using the cooperation of the plurality of the measuring cameras to shoot image data in the different time periods in a whole area of the grid detection lines at the multiple angles;

step 403: transmitting the image data collected by the measuring cameras to the data processor, calculating three-dimensional coordinates of the area of the grid detection lines taking the grid detection lines as the position references respectively, calculating the size and the shape of the area of the detection lines with the image data of the area of the detection lines obtained from different shooting visual angles, and then integrating the three-dimensional coordinates, the size and shape information by a pixel position of the grid detection lines in the image data to establish the low-density point cloud data of the inner wall of the tunnel;

at the same time, extracting intersections of the grid detection lines as capture points using a deep learning image segmentation algorithm by the data processor, and obtaining pixel displacement data and key frame data of a same capture point area in the different time periods at the different angles, and calculating pixel displacement data of the area of the detection lines between two adjacent capture points based on the capture points; and then integrating the three-dimensional coordinates, the size and shape information to establish low-density point cloud data of the inner wall of the tunnel;

step 404: sending the corrected point cloud data to the application terminal to convert into the four-dimensional model of the tunnel;

step 405: displaying the continuously corrected and converted four-dimensional model of the tunnel by the application terminal according to the order of the time axis to obtain the dynamic four-dimensional model of the tunnel; and step 406: using the image comparison algorithm to compare the new three-dimensional model with the historical three-dimensional model by the application terminal, and displaying overall dynamic deformation parameters of tunnel crown and side wall space.

Embodiment 3

Figure 9:
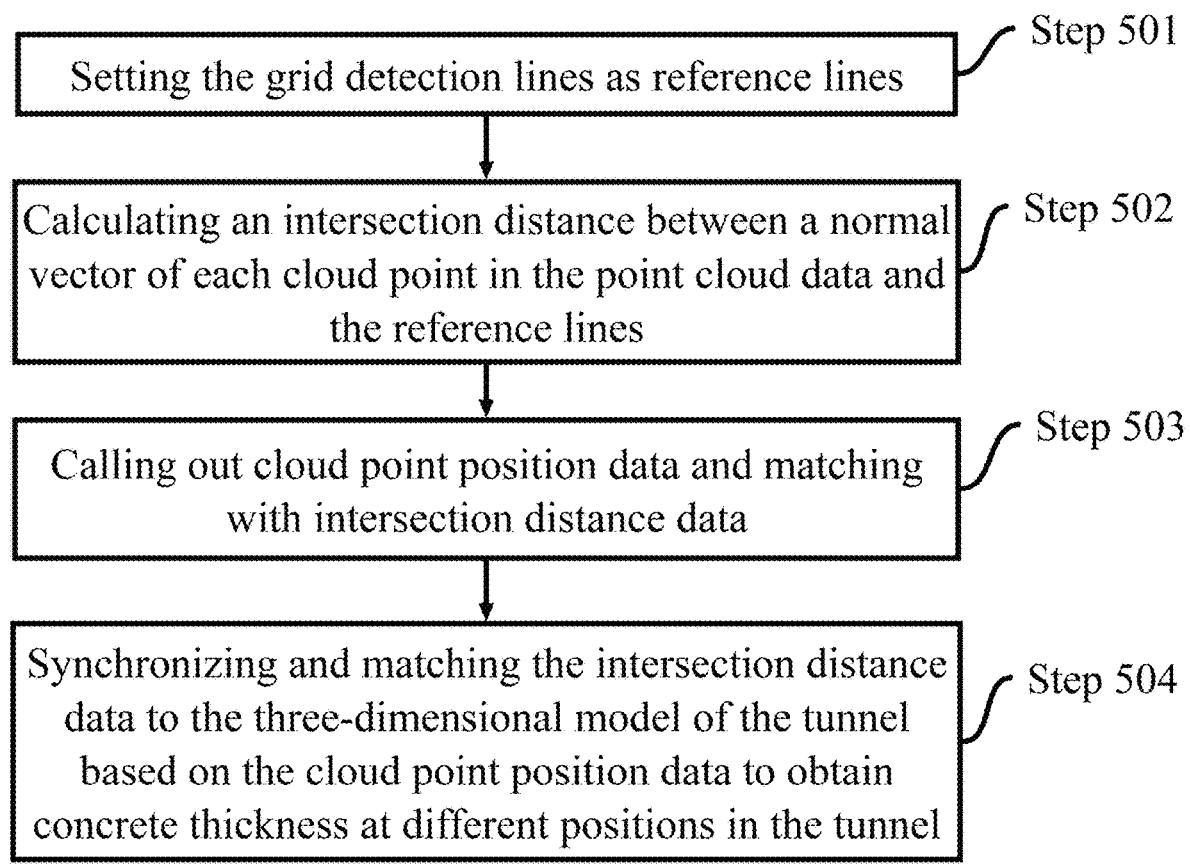
FIG. 9 is a schematic flow chart for calculating the thickness of tunnel side wall concrete by using point cloud data

As shown in FIG. 9, the corrected point cloud data in the step 104 is also capable of being used to calculate the concrete thickness of the inner wall of the tunnel, and a specific calculation method is as follows:

step 501: setting the grid detection lines as reference lines;

step 502: calculating an intersection distance between a normal vector of each cloud point in the point cloud data and the reference lines;

step 503: calling out cloud point position data and matching with intersection distance data; and step 504: synchronizing and matching the intersection distance data to the three-dimensional model of the tunnel based on the cloud point position data to obtain concrete thickness at different positions in the tunnel.

Embodiment 4

Figure 10:
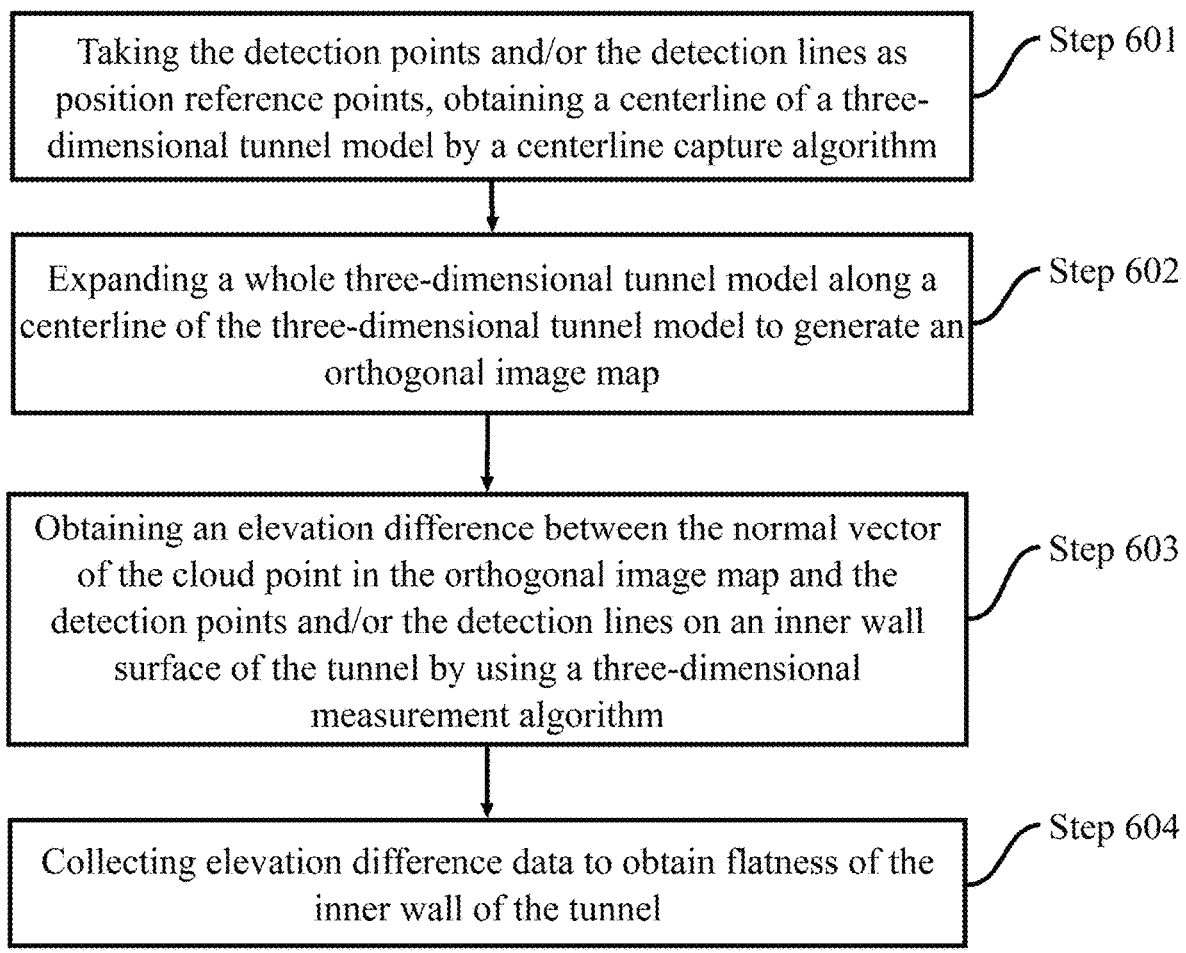
FIG. 10 is a schematic flow chart for calculating the flatness of tunnel side wall by using point cloud data

As shown in FIG. 10, the four-dimensional tunnel model generated in the step 105 is also capable of being used to measure smoothness of the inner wall of the tunnel, and a specific measurement method is as follows:

step 601: taking the detection points and/or the detection lines as position reference points, obtaining a centerline of a three-dimensional tunnel model by a centerline capture algorithm;

step 602: expanding a whole three-dimensional tunnel model along a centerline of the three-dimensional tunnel model to generate an orthogonal image map;

step 603: obtaining an elevation difference between the normal vector of the cloud point in the orthogonal image map and the detection points and/or the detection lines on an inner wall surface of the tunnel by using a three-dimensional measurement algorithm; and step 604: collecting elevation difference data to obtain flatness of the inner wall of the tunnel.

Therefore, by expanding the three-dimensional model into a two-dimensional orthogonal image map, the three-dimensional calculation method of curved surface is converted into a two-dimensional calculation method, which may not only save the calculation power needed for calculating the elevation difference, but also ensure the calculation result to be more accurate.

Embodiment 5

Figure 11:
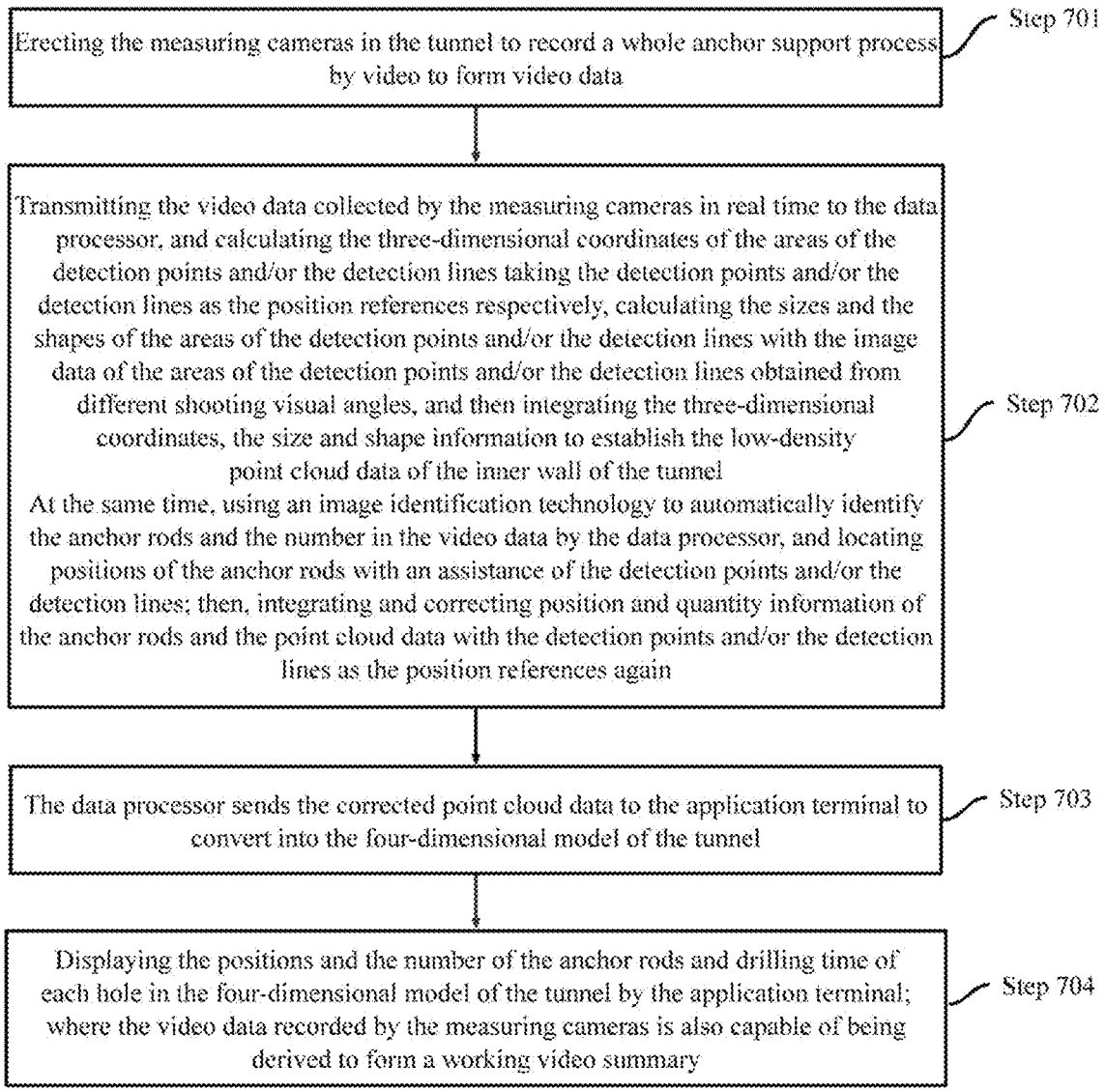
FIG. 11 is a schematic flow chart for monitoring the installation position, quantity and installation time of anchor rods in real time

As shown in FIG. 11, a data collection method of the measuring cameras in the step 102 is also capable of being used to record a shotcrete and anchor support process and positions and a number of anchor holes, and a specific recording method is as follows:

step 701: erecting the measuring cameras in the tunnel to record a whole anchor support process by video to form video data;

step 702: transmitting the video data collected by the measuring cameras in real time to the data processor, and calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from different shooting visual angles, and then integrating the three-dimensional coordinates, the size and shape information to establish the low-density point cloud data of the inner wall of the tunnel; at the same time, using an image identification technology to automatically identify the anchor rods and the number in the video data by the data processor, and locating positions of the anchor rods with an assistance of the detection points and/or the detection lines; then, integrating and correcting position and quantity information of the anchor rods and the point cloud data with the detection points and/or the detection lines as the position references again;

step 703: sending the corrected point cloud data to the application terminal to convert into the four-dimensional model of the tunnel; and step 704: displaying the positions and the number of the anchor rods and drilling time of each hole in the four-dimensional model of the tunnel by the application terminal; where the video data recorded by the measuring cameras is also capable of being derived to form a working video summary.

Embodiment 6

Figure 12:
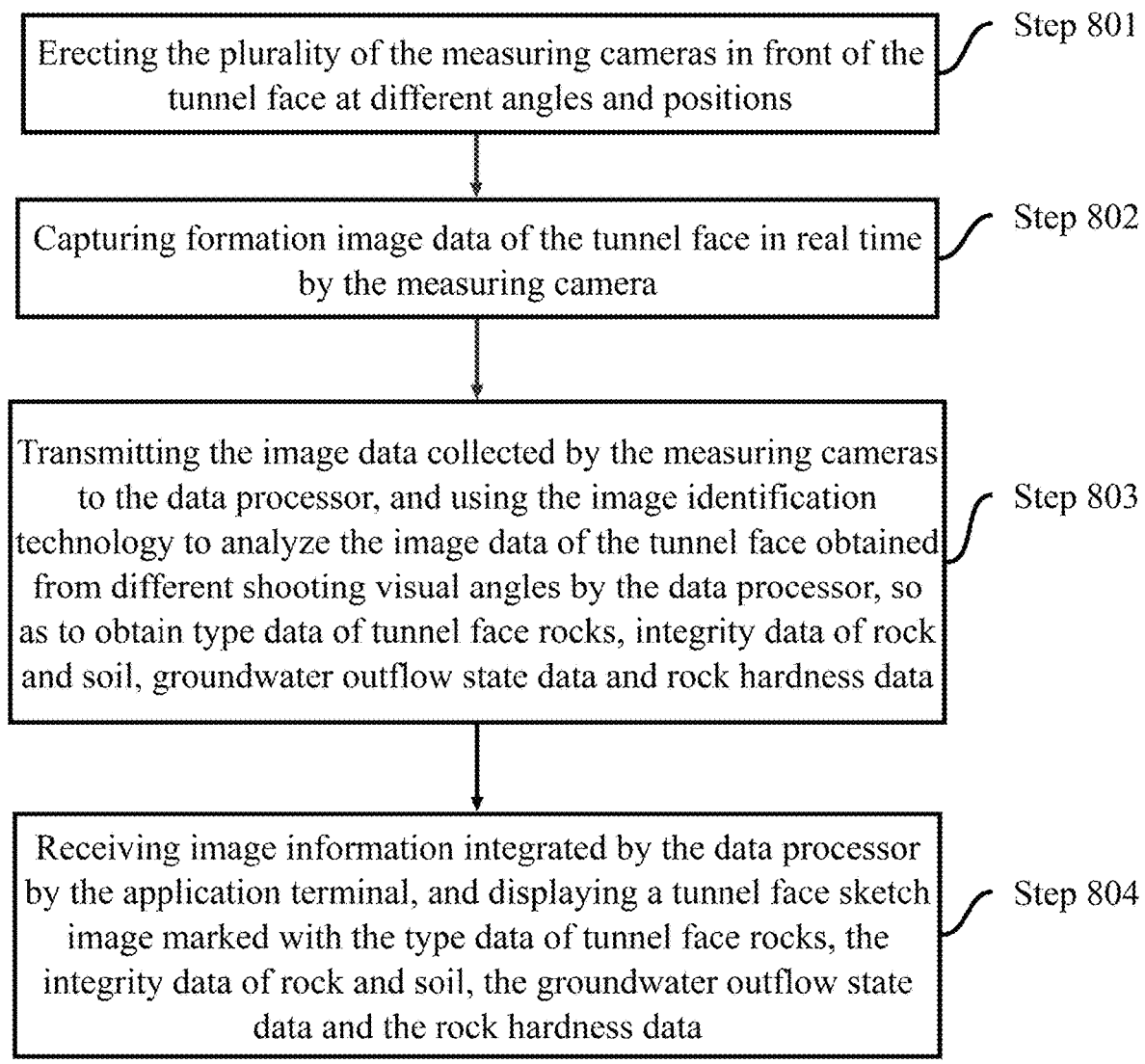
FIG. 12 is a schematic flow chart for automatically generating the sketch data of the tunnel face according to the present disclosure

As shown in FIG. 12, the data collection method of the measuring cameras in the step 102 is also capable of being used to generate the tunnel face sketch data, and a specific generation method is as follows:

step 801: erecting the plurality of the measuring cameras in front of the tunnel face at different angles and positions;

step 802: capturing formation image data of the tunnel face in real time by the measuring camera;

step 803: transmitting the image data collected by the measuring cameras to the data processor, and using the image identification technology to analyze the image data of the tunnel face obtained from different shooting visual angles by the data processor, so as to obtain type data of tunnel face rocks, integrity data of rock and soil, groundwater outflow state data and rock hardness data; and step 804: receiving image information integrated by the data processor by the application terminal, and displaying a tunnel face sketch image marked with the type data of tunnel face rocks, the integrity data of rock and soil, the groundwater outflow state data and the rock hardness data.

From the tunnel face sketch data, engineers may clearly understand the structure, hardness and joint characteristics of each part of the tunnel face, and provide data support for the optimization of drilling and blasting of the face.

The method and the system for automatically collecting multiple information of a tunnel during construction period establish detection points and detection lines on the inner side wall of the tunnel through light sources. On the one hand, the detection points are used as a capture points of the measuring cameras, so that it is convenient to detect the pixel displacement of side wall of the tunnel area where the detection point is located in different time periods in real time to obtain deformation data of the area of the detection points, or to obtain deformation data of multiple continuous sections of the tunnel wall under the connection of the detection lines; moreover, the detection points and detection lines may be used as reference standards, and some point cloud data may be updated based on the real-time detection points and pixel positions of the detection lines collected by the measuring cameras, so as to obtain an accurate four-dimensional model of the tunnel in real time, and the detection points and detection lines as reference objects may also assist the measuring cameras to accurately locate and record specific points, such as the position of the anchor rods; on the other hand, in the process of calculating the thickness and flatness of the tunnel wall concrete based on the four-dimensional model of the tunnel, the detection points and the detection lines may be used as the reference standards, which is convenient for comparing and calculating the distance from the normal vector of each cloud point in the point cloud data to the detection points and the detection lines to obtain the thickness of the concrete, and for locating the centerline of the tunnel through the detection point and the detection line, so that the three-dimensional model of the tunnel may be unfolded into an orthogonal image with the centerline, and the flatness data of the concrete may be obtained conveniently.

The application realizes the collection of tunnel data through the cooperation of light source and measuring camera, and establishes an accurate four-dimensional model in the tunnel construction process through the data processor and application terminal, and the four-dimensional model may be used to optimize the design of tunnel face drilling and blasting, calculate the thickness and flatness of concrete, record the video of shotcrete and anchor construction process and record the position of anchor rod. The whole monitoring and later calculation are automated, the monitoring systems are connected in parallel, and the data are common with each other, which effectively improves the automation and intelligence of the whole tunnel construction monitoring system and makes the whole tunnel construction more efficient and safe.

The basic principle, main features and advantages of the present disclosure have been shown and described above. It should be understood by those skilled in the art that the present disclosure is not limited by the above-mentioned embodiments, and what is described in the above-mentioned embodiments and specifications only illustrates the principle of the present disclosure. Without departing from the spirit and scope of the present disclosure, there will be various changes and improvements in the present disclosure, which fall within the scope of the claimed disclosure. The scope of that present disclosure is defined by the appended claim and their equivalents.

What is claimed is:

1. A system for automatically collecting multiple information of a tunnel during construction period, comprising:
a plurality of light sources, wherein the light sources are set on a side wall of the tunnel to form detection points and/or detection lines on an inner wall of the tunnel; a plurality of measuring cameras are erected around the detection points and/or the detection lines, and the measuring cameras are used for collecting and recording image data of areas of the detection points and/or the detection lines in real time, and a shooting visual angle range formed by a combination of the plurality of the measuring cameras covers all surfaces of the areas of the detection points and/or the detection lines;

a data processor, wherein a signal input end of the data processor is connected with the measuring cameras, used for receiving the image data collected by the measuring cameras in real time, calculating three-dimensional coordinates of the areas of the detection points and/or the detection lines taking the detection points and/or the detection lines as position references respectively, calculating sizes and shapes of the areas of the detection points and/or the detection lines with the image data of the areas of the detection points and/or the detection lines obtained from different the shooting visual angles, and then integrating the three-dimensional coordinates, size and shape information to establish low-density point cloud data of the inner wall of the tunnel; and an application terminal, wherein a signal input end of the application terminal is connected with a signal output end of the data processor, and is used for receiving real-time point cloud data updated and corrected by the data processor, and displaying a four-dimensional model of the tunnel established according to the point cloud data, and at the same time, feeding back and displaying deformation data, concrete thickness data, tunnel flatness data, anchor rod number, position data and tunnel face sketch data comprising the areas of the detection points and/or the detection lines according to the four-dimensional model;

wherein a method for automatically collecting the multiple information of the tunnel during the construction period comprises following steps:

step 101: arranging the plurality of the light sources in lateral or longitudinal direction of the side wall of the tunnel, and forming the detection points and/or the detection lines on a crown and the side wall of the tunnel by using the light sources;

step 102: erecting the plurality of the measuring cameras around the detection points and/or the detection lines, and shooting and collecting the image data of a whole area of the detection points and/or the detection lines in different time periods in real time from multiple angles by using a cooperation of the plurality of the measuring cameras;

step 103: transmitting the image data collected by the measuring cameras in real time to the data processor, and by the data processor, calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from the shooting visual angles, and then integrating the three-dimensional coordinates, the size and shape information to establish the low-density point cloud data of the inner wall of the tunnel; at the same time, using an image capture algorithm to compare pixel displacement data and key frame data of an area of a same detection point and/or detection line at different angles in different periods; and taking the detection points, and using the pixel displacement data and the key frame data in the areas of the detection points and/or the detection lines, calibrating and updating a part of point clouds generating position movement in the point cloud data in real time;

step 104: sending real-time corrected point cloud data to the application terminal by the data processor to convert into the four-dimensional model of the tunnel;

step 105: displaying a continuously corrected and converted four-dimensional model of the tunnel by the application terminal according to an order of a time axis to obtain a dynamic four-dimensional model of the tunnel; and step 106: using an image comparison algorithm to compare a new three-dimensional model with a historical three-dimensional model by the application terminal, and displaying real-time dynamic deformation data, concrete thickness data and tunnel flatness data of the inner wall of the tunnel;

the light sources in the step 101 comprise a point light source, and a method for realizing deformation detection of an accurate point on a tunnel wall based on the point light source is as follows:

step 201: projecting the point light source to a certain point needing accurate observation on the side wall of the tunnel to form a detection point;

step 202: erecting the plurality of the measuring cameras around the detection point, and shooting and collecting the image data of a whole detection point in the different time periods from the multiple angles by using the cooperation of the plurality of the measuring cameras;

step 203: transmitting the image data collected by the measuring cameras to the data processor, and using the image capture algorithm to compare the pixel displacement data and the key frame data of the area of the same detection point at the different angles by the data processor in the different time periods frame by frame, and then calculating the deformation data of the area of the detection point;

and step 204: sending the deformation data of the area of the detection point and the time axis to the application terminal by the data processor for displaying current deformation data of an area of the side wall of the tunnel of the detection point;

the light sources in the step 101 comprise a line light source, and a tunnel wall deformation detection method based on the line light source is as follows:

step 301: installing the line light source on the side wall of the tunnel along a length direction of the tunnel, and forming section detection lines with a same or arbitrary spacing on the crown and the side wall of the tunnel;

step 302: erecting the plurality of the measuring cameras around the detection lines, and using the cooperation of the plurality of the measuring cameras to shoot image data in the different time periods in a whole area of the detection lines at the multiple angles;

step 303: transmitting the image data collected by the measuring cameras to the data processor, calculating the three-dimensional coordinates of the area of the detection lines taking the detection lines as the position references respectively, calculating a size and a shape of the area of the detection lines with the image data of the area of the detection lines obtained from the shooting visual angles, and then integrating the three-dimensional coordinates, the size and shape information to establish the low-density point cloud data of the inner wall of the tunnel; at the same time, extracting the area of the detection lines by a threshold segmentation and centerline extraction algorithm by the data processor, and then fusing with original detection lines and historical pixel position data of the area of the detection lines and calculating to obtain pixel displacement data and key frame data of a same area of the detection lines at the different angles in the different time periods; and using the detection lines to calibrate and update the part of the point clouds generating the position movement in the point cloud data in real time by using the pixel displacement data and the key frame data in the area of the detection lines;

step 304: sending corrected point cloud data to the application terminal by the data processor to convert into the four-dimensional model of the tunnel;

step 305: displaying the continuously corrected and converted four-dimensional model of the tunnel by the application terminal according to the order of the time axis to obtain the dynamic four-dimensional model of the tunnel; and step 306: using the image comparison algorithm to compare the new three-dimensional model with the historical three-dimensional model by the application terminal, and displaying the real-time dynamic deformation data of the crown and the side wall of the detection lines in the tunnel;

the light sources in the step 101 also comprise a surface light source, and a tunnel wall deformation detection method based on the surface light source is as follows:

step 401: installing a plurality of surface light sources on the side wall of the tunnel along the length direction of the tunnel, and forming grid detection lines on the crown and the side wall of the tunnel;

step 402: erecting the plurality of the measuring cameras around the grid detection lines, and using the cooperation of the plurality of the measuring cameras to shoot image data in the different time periods in a whole area of the grid detection lines at the multiple angles;

step 403: transmitting the image data collected by the measuring cameras to the data processor, calculating three-dimensional coordinates of the area of the grid detection lines taking the grid detection lines as the position references respectively, calculating the size and the shape of the area of the detection lines with the image data of the area of the detection lines obtained from the shooting visual angles, and then integrating the three-dimensional coordinates, the size and shape information by a pixel position of the grid detection lines in the image data to establish the low-density point cloud data of the inner wall of the tunnel; at the same time, extracting intersections of the grid detection lines as capture points using a deep learning image segmentation algorithm by the data processor, and obtaining pixel displacement data and key frame data of a same capture point area in the different time periods at the different angles, and calculating pixel displacement data of the area of the detection lines between two adjacent capture points based on the capture points; and then integrating the three-dimensional coordinates, the size and shape information to establish the low-density point cloud data of the inner wall of the tunnel;

step 404: sending the corrected point cloud data to the application terminal to convert into the four-dimensional model of the tunnel;

step 405: displaying the continuously corrected and converted four-dimensional model of the tunnel by the application terminal according to the order of the time axis to obtain the dynamic four-dimensional model of the tunnel; and step 406: using the image comparison algorithm to compare the new three-dimensional model with the historical three-dimensional model by the application terminal, and displaying overall dynamic deformation parameters of tunnel crown and side wall space;

the corrected point cloud data in the step 104 is also capable of being used to calculate concrete thickness of the inner wall of the tunnel, and a specific calculation method is as follows:

step 501: setting the grid detection lines as reference lines;

step 502: calculating an intersection distance between a normal vector of each cloud point in the point cloud data and the reference lines; step 503: calling out cloud point position data and matching with intersection distance data; and step 504: synchronizing and matching the intersection distance data to a three-dimensional model of the tunnel based on the cloud point position data to obtain concrete thickness at different positions in the tunnel;

a four-dimensional tunnel model generated in the step 105 is also capable of being used to measure smoothness of the inner wall of the tunnel, and a specific measurement method is as follows:

step 601: taking the detection points and/or the detection lines as position reference points, obtaining of a three-dimensional tunnel model by a centerline capture algorithm;

step 602: expanding a whole three-dimensional tunnel model to generate an orthogonal image map;

step 603: obtaining an elevation difference between the normal vector of the cloud point in the orthogonal image map and the detection points and/or the detection lines on an inner wall surface of the tunnel by using a three-dimensional measurement algorithm; and step 604: collecting elevation difference data to obtain flatness of the inner wall of the tunnel;

a data collection method of the measuring cameras in the step 102 is also capable of being used to record a shotcrete and anchor support process and positions and a number of anchor holes, and a specific recording method is as follows:

step 701: erecting the measuring cameras in the tunnel to record a whole anchor support process by video to form video data;

step 702: transmitting the video data collected by the measuring cameras to the data processor, and calculating the three-dimensional coordinates of the areas of the detection points and/or the detection lines taking the detection points and/or the detection lines as the position references respectively, calculating the sizes and the shapes of the areas of the detection points and/or the detection lines with the image data of the areas of the detection points and/or the detection lines obtained from the shooting visual angles, and then integrating the three-dimensional coordinates, the size and shape information to establish the low-density point cloud data of the inner wall of the tunnel; at the same time, using an image identification technology to automatically identify anchor rods and a number in the video data by the data processor, and locating positions of the anchor rods with an assistance of the detection points and/or the detection lines; then, integrating and correcting position and quantity information of the anchor rods and the point cloud data with the detection points and/or the detection lines as the position references again;

step 703: sending the corrected point cloud data to the application terminal to convert into the four-dimensional model of the tunnel; and step 704: displaying the positions and the number of the anchor rods and drilling time of each hole in the four-dimensional model of the tunnel by the application terminal; wherein the video data recorded by the measuring cameras is also capable of being derived to form a working video summary;

the data collection method of the measuring cameras in the step 102 is also capable of being used to generate the tunnel face sketch data, and a specific generation method is as follows:

step 801: erecting the plurality of the measuring cameras in front of a tunnel face at different angles and positions;

step 802: capturing formation image data of the tunnel face in real time by the measuring cameras;

step 803: transmitting the image data collected by the measuring cameras to the data processor, and using the image identification technology to analyze the image data of the tunnel face obtained from the shooting visual angles by the data processor, so as to obtain type data of tunnel face rocks, integrity data of rock and soil, groundwater outflow state data and rock hardness data; and step 804: receiving image information integrated by the data processor by the application terminal, and displaying a tunnel face sketch image marked with the type data of tunnel face rocks, the integrity data of rock and soil, the groundwater outflow state data and the rock hardness data.

2. The system for automatically collecting the multiple information of the tunnel during the construction period according to claim 1, wherein the light sources are one or more combinations of the point light source, the line light source and the surface light source.

* * * * *